N. W. AKIMOFF.
STATIC BALANCING MACHINE.
APPLICATION FILED AUG. 15, 1916. RENEWED JULY 6, 1918.
1,296,609.
Patented Mar. 11, 1919.
2 SHEETS—SHEET 2.
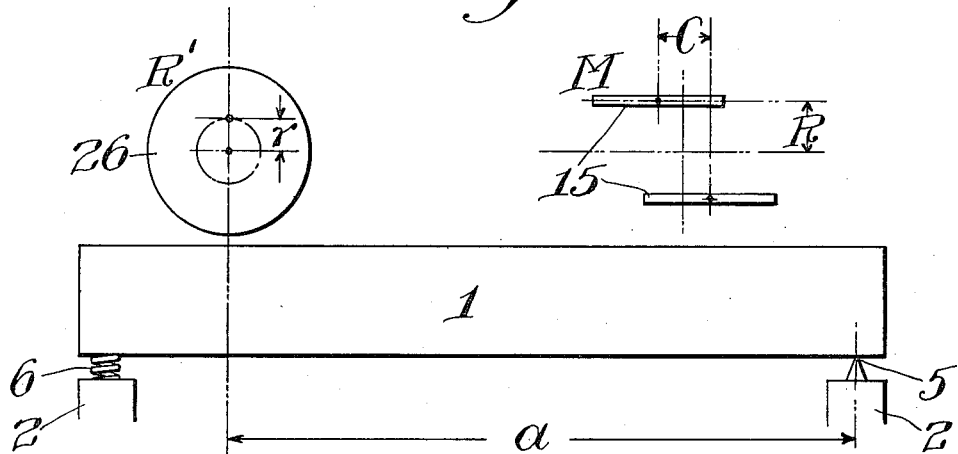
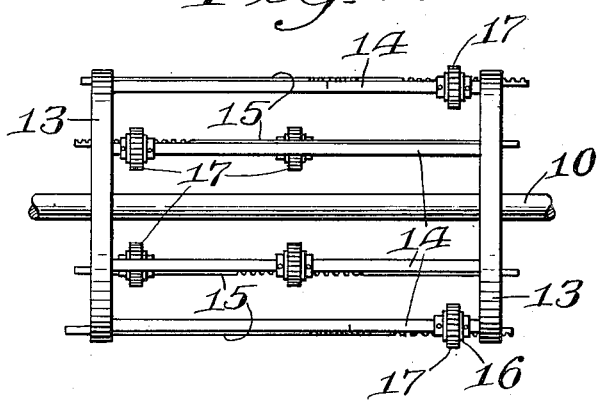
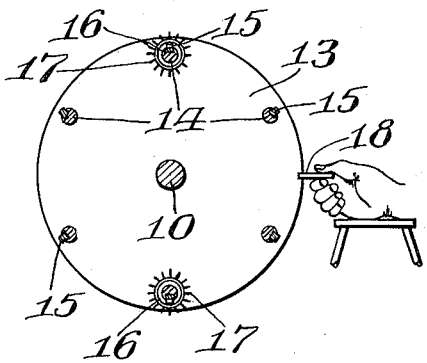
Witnesses
Inventor
Nicholas W. Akimoff,
By J. Stuart Freeman.
Attorney

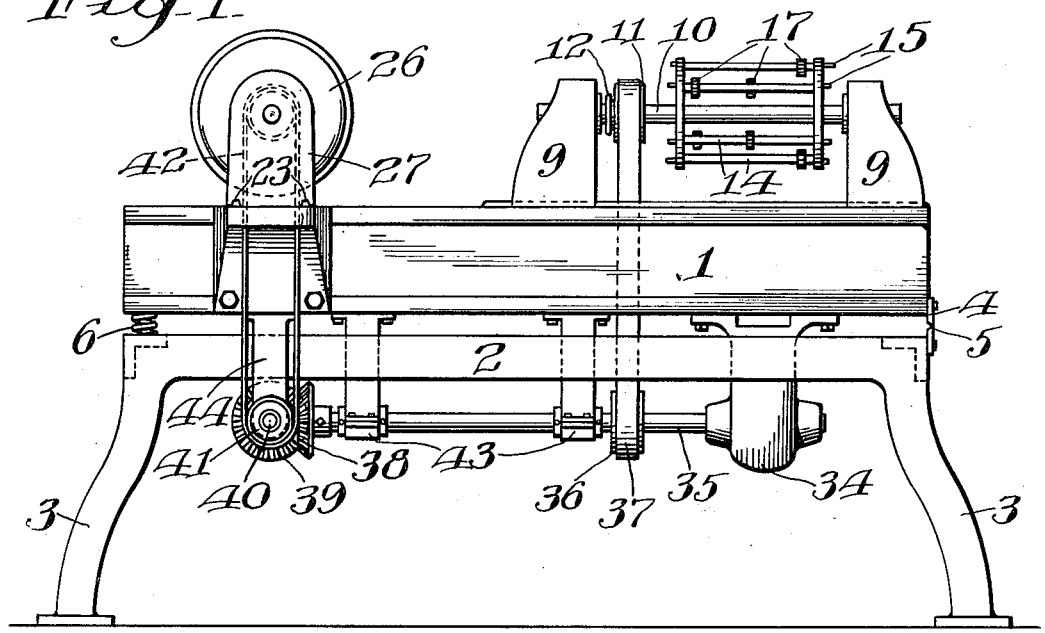
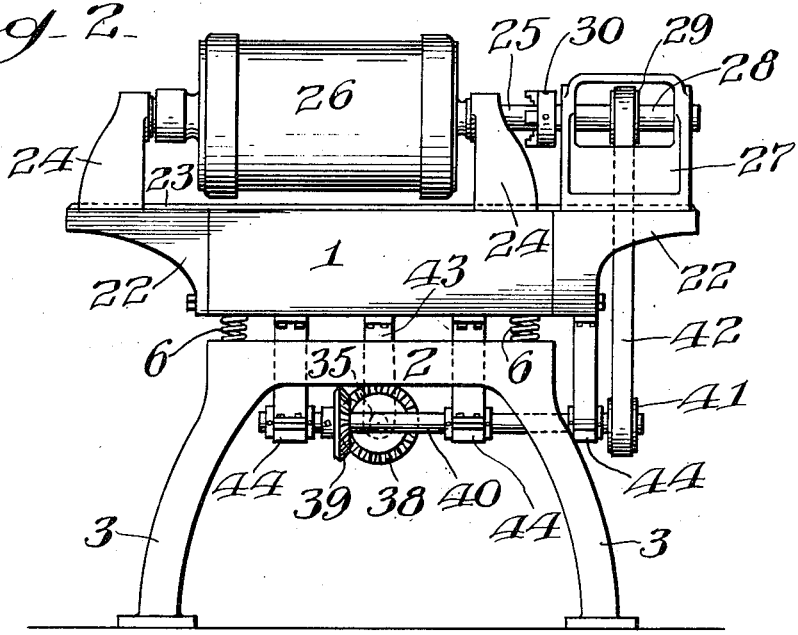

UNITED STATES PATENT OFFICE.

NICHOLAS W. AKIMOFF, OF PHILADELPHIA, PENNSYLVANIA, ASSIGNOR TO DYNAMIC BALANCING MACHINE COMPANY, OF PHILADELPHIA, PENNSYLVANIA, A CORPORATION OF PENNSYLVANIA.

STATIC BALANCING-MACHINE.

1,296,609.  Specification of Letters Patent.  Patented Mar. 11, 1919.

Application filed August 15, 1916, Serial No. 114,986. Renewed July 6, 1918. Serial No. 243,701.

*To all whom it may concern:*

Be it known that I, NICHOLAS W. AKIMOFF, a subject of the Czar of Russia, residing at Philadelphia, in the county of Philadelphia and State of Pennsylvania, have invented certain new and useful Improvements in Static Balancing-Machines, of which the following is a specification.

The object of this invention is to provide a machine by which it is possible to test bodies for the condition of static balance, and to indicate the degree thereof. By static balance of a rotatable body is understood the coincidence of the center of gravity of said body with one of the points lying upon its axis of rotation.

The means heretofore employed for securing this condition of balance are all based upon principles in which frictional resistances are always present to a certain degree, wherefore the results are never perfect. Such means as have been known and employed are:—parallel ways, rollers, and similar apparatus.

The present invention contemplates an arrangement consisting of a vibratory beam pivoted at one end and supported by a suitable spring, or springs, at the other. A rotary body (" R ") is then placed with its axis of rotation perpendicular to the plane of oscillation of the said beam and is arranged in pillow blocks or other bearings mounted on the said beam in such a manner that the distance (" a ") between the parallel vertical planes passing through said pivot and said axis is always constant for all bodies thus operatively positioned.

Under the condition of unbalance of a body being tested, the center of gravity lies at a certain distance (" r ") from the axis of rotation and causes the said body when rotated in its bearings to oscillate the said beam. In fact, the centrifugal force of the center of gravity of the body, taken in conjunction with the leverage (" a ") creates a couple with a certain moment about the said pivot, or hinge, varying according to the plane pendulum, or simple harmonic motion law, when the frequency of the forced vibration of the beam becomes of the same period as the rotation of the body.

Regardless, for the present, of the means by which the rotation is accomplished, if it were possible to provide a couple of the same varying moment, but negatively located, and having an axis parallel to the plane of oscillation, there would be a state or condition of equilibrium under all speeds. This is accomplished by means of a cage, or any other device, capable of producing a certain centrifugal couple equal to $MRCw^2$, wherein $w$ is the same as for the body R. If now under a certain adjustment of the cage, the beam stops vibrating, then in view of the equilibrium, $mrw^2a = MRw^2C$.

Hence, knowing M, R, C and $a$, we have the product $mr$ for the body, as well as the axial plane in which this surplus weight is located. With these factors positively determined, the operator can suit the practical conditions existing in a given body in determining how to arrange $m$ and $r$ so that the amount of material of the body cut away at a certain radius will be $mr$ as above explained. In order to bring out or magnify the unbalancing effect, it is advisable to operate the body at a relatively high speed, although this is merely a matter of practice and not of principle. Furthermore, by this construction and operation the friction between the coöperating parts in no way prevents a positive manifestation by the body of the slightest degree of static unbalance.

The details of the construction and operation of the preferred form of the invention are clearly brought out in the following description, when read in conjunction with the accompanying drawings in which Figure 1 is a front elevation of the preferred embodiment of the invention; Fig. 2 is an end elevation of the same; Fig. 3 is a diagrammatic view showing the geometrical relation of the physical bodies involved; Fig. 4 is an enlarged detail view of the dynamically adjustable balancing mechanism; Fig. 5 is a vertical transverse section of the same.

Referring to the drawings, a bed 1 is provided, and pivotally supported by a frame 2 having legs 3 by means of a resilient member 4, transversely reduced in cross-section at 5 to localize the point of greatest yield. At another part of the said bed the same is supported by and spaced from the said frame by one or more suitable spring members 6, having a predetermined natural period of vibration under a given load, though said period may be varied by any suitable means, as by adjusting the position upon the device of a weight, such as that described in application Serial No. 110,275.

Rigidly carried by the bed 1 and adjacent to one end thereof is a pair of bearing blocks 9, revolubly carrying a shaft 10 in turn provided with a pulley 11, which latter is adjustably secured to said shaft by means of any suitable clutch mechanism 12. Also secured to the said shaft is a squirrel cage comprising spaced plates 13, between which extend spacing rods 14, carrying slidably positioned rods or weights 15, in turn adjusted longitudinally of the cage by means of wheels 16 provided with radially extending vanes 17, adapted to be actuated by friction means 18, or fluid pressure, as they revolve past the same during the rotation of said cage, said weights or supporting rods being graduated in special units representing the turning moment of the object to be tested about its axis, the length of such unit being dependent upon the particular balancing machine.

At the farther end of the bed 1 the same is preferably extended laterally at 22 and provided with a track 23 upon which are slidably positioned bearing blocks 24, in turn carrying a rotatable shaft 25 adapted to support a body 26, the static balance of which is to be tested. Upon one of the extensions 22 is rigidly mounted a head stock 27, carrying an auxiliary shaft 28 with a pulley 29, and a chuck 30 adapted to grip the adjacent end of the shaft 25 to revolve the latter.

Upon and secured to the under side of the bed 1 is a motor 34, the shaft 35 of which carries a pulley 36, between which and the pulley 11 extends a belt 37 or the like, and a bevel gear 38 meshing with a similar gear 39 upon a shaft 40, extending at right angles to the said shaft 35, and carrying a pulley 41, connected to the pulley 29 by means of a belt 42. The former of said last-named shafts is suspended from the bed by means of brackets 43, while the latter of said shafts is suspended by means of brackets 44.

In this manner as the motor or other driving mechanism is operated, the shafts 10 and 25 are revolved in absolute synchronism and the angular position of each of the weights 15 maintains a constant relationship with a given axial plane of the body 26. Therefore, by longitudinally adjusting an oppositely positioned pair of the cage weights, the balance of the said body being tested is determined, while to facilitate the operation the said balancing cage as shown is provided with three such pairs.

If then a superfluous amount of material exists on, or as an integral part of, said body, but in a plane other than those corresponding to the original positions of the said pairs of weights, the said cage is revolved about its shaft 10 through the desired number of degrees by releasing the same with the clutch mechanism 12, after which alteration the said mechanism is again made secure, and the operation above described is repeated. In this manner the exact position of the cause of unbalance is readily ascertained, and the operation is greatly facilitated when the device is provided with an azimuth changing mechanism, such for instance as that described in application Serial No. 110,276.

In the operation of this device in the manner above described it is to be noted that friction in no way plays a part, except to take up a small portion of the effective power of the driving unit; in other words, the vibration of the bed, due to the slightest possible degree of unbalance of the body when revolved at high speeds, is positive and for all practical purposes entirely unrestrained, until the unbalancing cause is nullified or counteracted by the proper adjustment of the cage weights as above described. To test out the efficiency of the device, the superfluous material is removed and the system again revolved with the cage weights all in their respective neutral positions.

In constructing the device, the axis of rotation of the cage may be in any position within a plane perpendicular to the axis of oscillation of the bed, but it is essential that the axis of rotation of the body being tested shall be parallel to the said axis of oscillation, or that the said body shall rotate in a plane perpendicular to said latter axis.

Having thus described my invention, what I claim and desire to protect by Letters Patent of the United States is:—

1. The method which consists in associating a statically unbalanced body with a body adjustable to be perfectly balanced dynamically so that the two revolve synchronously, and form part of an unbalanced movable system, and then adjusting said last-named body while said system is in motion, to neutralize the unbalanced condition of said first body to balance said system.

2. The method which consists in associating a statically unbalanced body, with an adjustable body adapted to indicate numerically the degree of unbalance of the first so that the two are arranged to revolve synchronously, and to form parts of an unbalanced movable system, and then adjusting said last-named body while said system is in motion, to neutralize the unbalanced condition of said first body to balance said system.

3. The method which consists in associating a statically unbalanced body with an adjustable body operative to indicate the degree of unbalance of the first so that the two are arranged to revolve synchronously, to form parts of an unbalanced movable system, the axis of one of said bodies being perpendicular to the axis of the other, and then adjusting said last-named body while said system is in motion, to neutralize the unbalanced condition of said first body, and to balance said system and indicate the degree of unbalance of said second body.

4. The method which consists in associating a statically unbalanced body with an adjustable body operative to indicate the degree of unbalance of the first so that the two are arranged to revolve synchronously and to form an unbalanced system, the axis of one of said bodies being perpendicular to the axis of the other, and with the said system mounted to vibrate in a plane perpendicular to the plane of rotation of said second body, and then adjusting said adjustable body while said system is in motion, to neutralize the unbalanced condition of said first body to balance said system and indicate the degree of unbalance of said second body.

5. A static balancing machine, comprisng a rotatable support for a body to be tested, a second body, means whereby said second body is adjustably supported to rotate upon an axis perpendicular to that of the body to be tested, an oscillator carrying said body supports and adapted to oscillate upon an axis parallel with the axis of said first-named support and perpendicular to that of the second support, and means whereby said supports are connected to revolve synchronously thus forming with said oscillator an oscillating system.

6. A static balancing machine, comprising a bed, a rotatable support for a body to be tested mounted upon said bed, and adjustable means also carried by said bed and adapted to be rotated synchronously with said support to statically balance a body connected therewith, said support and said means being rotatable upon axes perpendicular to each other.

7. A static balancing machine, comprising a bed, a rotatable support for a body to be tested mounted upon said bed, and adjustable means also carried by said bed and adapted to be rotated synchronously with said support to balance a body connected with said support, said support and said body having a common axis of oscillation perpendicular to the plane of rotation of said support.

8. A static balancing machine, comprising a bed mounted to oscillate upon a fixed axis, a revoluble support for a body to be tested mounted upon said bed, means rotatable in a plane parallel with the axis of oscillation of said bed and comprising weights adjustable while said means is in motion to create a couple operative to counteract the unbalanced condition of a body upon said support, and means to rotate said support and said first means synchronously.

9. A static balancing machine, comprising a bed mounted to oscillate upon a fixed axis, a support for a body to be tested carried by said bed and revoluble in a plane perpendicular to said axis, rotatable means also carried by said bed and adapted to create a centrifugal couple operative to counteract the unbalanced condition of a body upon said support, and means to rotate said support and said first means in synchronism.

10. A static balancing machine, comprising a bed mounted to oscillate upon a fixed axis, a support for a body to be tested carried by said bed and revoluble in a plane perpendicular to said axis, rotatable means also carried by said bed and adapted to create a centrifugal couple to counteract the unbalanced condition of a body upon said support, said means comprising longitudinally adjustable weights movable while said means is in motion, and means to rotate said support and said first means in synchronism.

11. A balancing machine, comprising an oscillatory mounting, means for rotatably supporting a body to be tested and carried by said mounting, rotatable means also carried by and adapted to impose a forced vibration upon said mounting and connections whereby said last means is revolved in harmony with a body upon said first means, the whole being operative to test the static balance of a body upon said first means.

12. A balancing machine, comprising an oscillatory mounting, means for rotatably supporting a body to be tested and carried by said mounting, means adapted to be balanced and unbalanced dynamically, also carried by said mounting, and connections whereby said last means is revolved in harmony with a body upon said first means, the whole being operative to test the static balance of a body upon said first means.

13. The method which consists in associating a statically unbalanced body, with a body adjustable to be perfectly balanced or unbalanced at will so that the two revolve synchronously, and form parts of an unbalanced movable system, then adjusting said last-named body dynamically to neutralize the unbalanced condition of said first body statically to balance said system.

14. The method which consists in associating a statically unbalanced body, with an adjustable body upon an oscillatory support, said last-named body being adjustable to be perfectly balanced and unbalanced at will, so that the two may be rotated in harmony, and form parts of an unbalanced movable system, rotating said bodies, and then adjusting said last-named body to neutralize the statically unbalanced condition of said first body to balance said system.

15. A balancing machine, comprising an oscillatory mounting, a support upon said mounting for a rotatable body to be tested statically, an adjustable rotatable means adapted to be perfectly balanced statically and to impose upon said mounting and said support forced vibrations of variable amplitude, and connections whereby the body upon said support and said means are rotatable synchronously.

16. A balancing machine, comprising an oscillatory support for a body to be tested statically, an adjustable rotatable means adapted to be perfectly balanced statically and to impose upon said support forced vibrations of variable amplitude, and connections whereby the body upon said support and said means are rotatable in synchronism.

17. The method which consists in mechanically associating a statically unbalanced body with a body adapted to be perfectly balanced and unbalanced dynamically at will so that each tends to oppose the tendency of the other to vibrate if unbalanced, and so that the two may be revolved synchronously, thus forming an unbalanced system, and then adjusting said last-named body to neutralize the unbalanced condition of said first body to balance said system.

In testimony whereof I have affixed my signature.

NICHOLAS W. AKIMOFF.